INVENTORS:
CARL R. VANDER LINDEN
LAURENCE R. BLAIR
BY
ATTORNEY

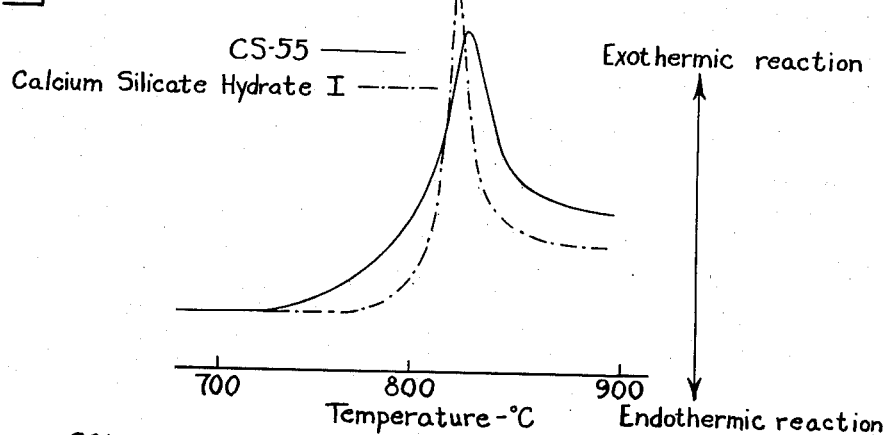
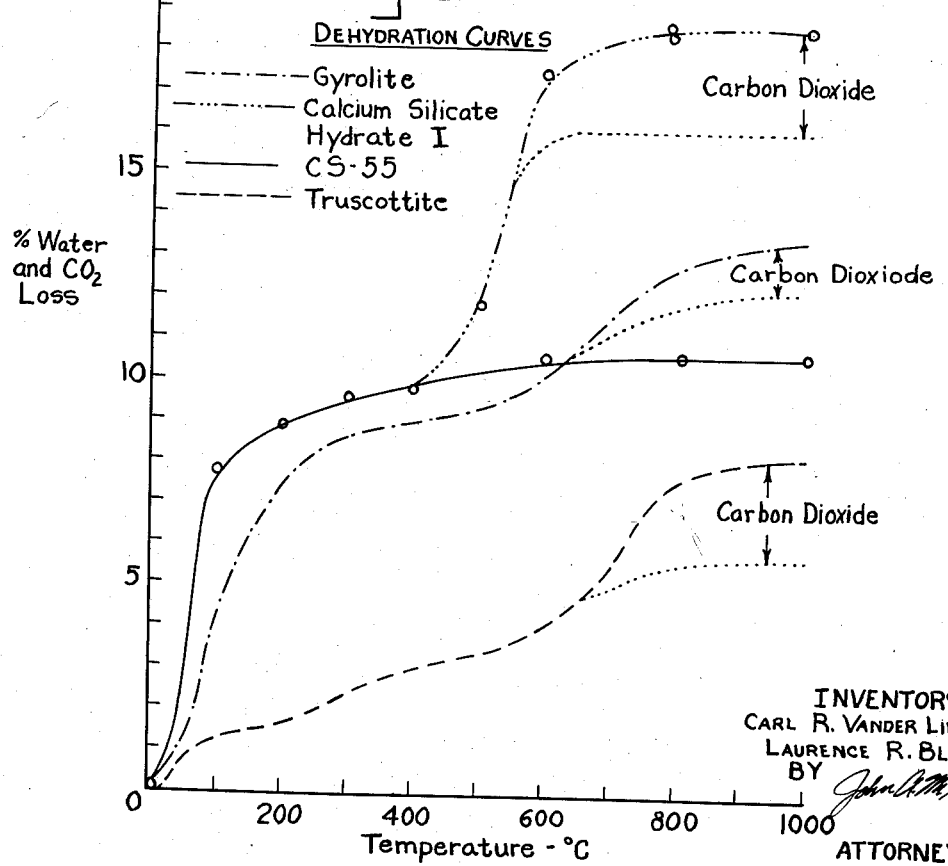

2,966,441

LOW SOLUBILITY HYDRATED CALCIUM SILICATE

Carl R. Vander Linden, Bound Brook, and Laurence R. Blair, Gillette, N.J., assignors to Johns-Manville Corporation, New York, N.Y., a corporation of New York Filed May 19, 1958, Ser. No. 736,203

26 Claims. (Cl. 167—42)

This invention relates to a new hydrated calcium silicate, products thereof and methods of preparing the same.

This application is a continuation-in-part of our co-pending United States patent application, Serial No. 580,352, filed April 24, 1956, now abandoned.

The United States Patent No. 1,574,363 to Calvert teaches the preparation of hydrated calcium silicates by reacting lime and a siliceous material, such as diatomaceous earth, in a water media. This patent describes a batch reaction at preferred temperatures of 90 to 105° C. to produce a filtration medium. The calcium silicate produced by such reaction conditions is identified in the art as calcium silicate hydrate I, a compound of variable composition having a $CaO/SiO_2$ molar ratio of 0.8 to 1.5 of lime to 1 of silica and described in detail by Taylor, Journal of the Chemical Society, 163 (1950).

It is also known in the art that the product produced by a reaction such as described by Calvert, once it has been dried and dispersed, is a finely divided, absorptive powder. Accordingly, such a product is useful as an inert carrier for organic insecticides due to its sorptive capacity, thus providing a means for producing a high concentrate flowable powder. However, there are numerous applications in the preparation of a wettable powder insecticide concentration where a product, such as produced by Calvert, is not suitable. Notably, one of these is in the preparation of a 75% wettable DDT powder which must meet the stringent specifications set up by the International Cooperation Administration.

We have now found a new hydrous silicate, and products thereof, which may be prepared from its components—lime, silica and water—and which possesses novel and unique chemical and physical properties and characteristics of substantial utility. Accordingly, the present invention consists of a new and useful hydrated calcium silicate, products thereof, a method of preparing the same and the use thereof.

It is one object of this invention to provide a new and definite hydrated calcium silicate and method of preparing the same.

A further object of this invention is to provide a new hydrated calcium silicate compound or product of new and unique characteristic properties, that is, a compound or product of low bulk density, greatly improved chemical stability, high liquid adsorptive capacity, and particularly a very low solubility substantially lower than that of Calvert's product, among other advantageous properties.

A still further object of this invention is to provide a calcium silicate compound or product which, due to its unique properties, is particularly adaptable for use as a carrier in the preparation of a wettable powder insecticide dispersion.

These and other objects and advantages will become apparent and will be more fully understood from a consideration of the following details descriptive of the invention.

Fig. 1 is a graph showing a comparison of the thermal analysis patterns of CS–55, the new hydrous calcium silicate compound of the present invention, and calcium silicate hydrate I;

Fig. 2 is a graph showing a comparison of the dehydration curves of CS–55, calcium silicate hydrate I, gyrolite and truscottite;

The preparation of the new hydrated calcium silicate may be effected with lime and a reactive siliceous material, such as diatomaceous earth, quartz, silica gel, etc., as starting materials. Preferably finely divided starting materials, such as finely divided hydrated lime and finely divided diatomaceous silica, are employed to reduce the reaction period. The new hydrated calcium silicate of this invention is prepared by hydrothermally reacting the starting ingredients or components in a molar ratio of about 0.67 CaO to 1 $SiO_2$.

It is preferred that the starting materials, such as finely divided lime and reactive silica, are initially suspended or dispersed in at least sufficient water to form a flowable slurry, e.g., about 4 to 17 parts by weight of water per part by weight of solids. It is essential, of course, that water be present during the reaction at least in an amount sufficient to provide the chemically combined water indicated in the formula. Moreover, as should be apparent, the amount of water mixed with the starting materials, or present during the reaction, should be sufficient to produce a flowable mass of ambient reactants whereby uninhibited and ready contact of substantially all of said reactants facilitates the reaction. It is preferred that the slurry, suspension or the like, in which the reaction takes place has a water to solids ratio of about 8 to 50 parts by weight of water per part by weight of solids. The lime and reactive siliceous material may be dispersed individually to form separate slurries, or together to form a single slurry as is desired or appropriate.

Figure 4:
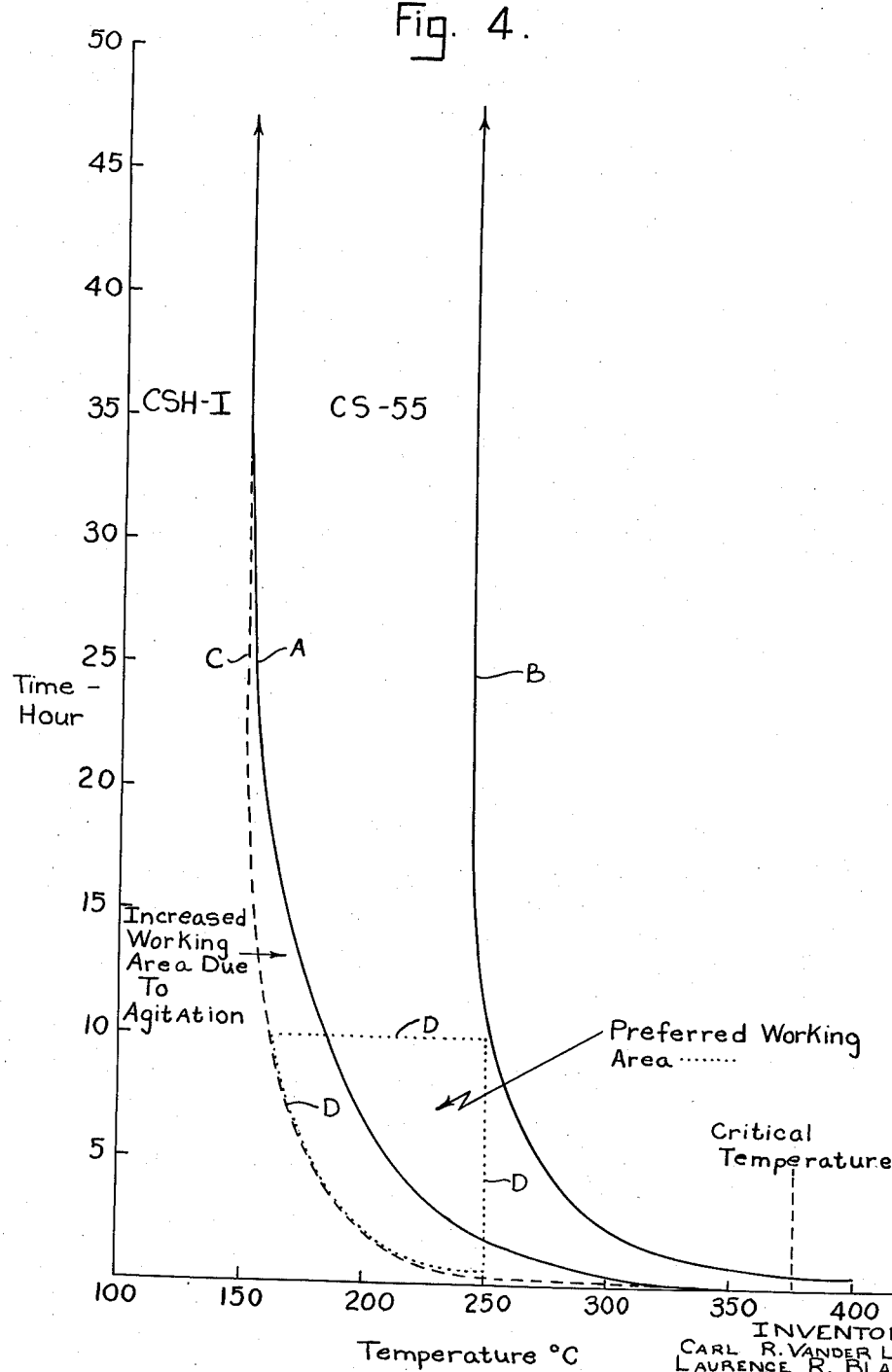
Fig. 4 is a graph defining the time and temperature reaction conditions necessary in the preparation of the new hydrous calcium silicate of the present invention, and illustrates the accelerating effect of agitation upon said reaction conditions.

The slurry or suspension of lime and reactive silica, prepared in accordance with the foregoing, is then hydrothermally reacted for a period of time, and at a temperature within the approximate limits defined by the solid lines designated A and B in the accompanying graph of Fig. 4 to effect the desired reaction. Agitation of the slurry containing the reactive materials, however, substantially increases the reaction rate over a wide temperature range and thereby materially reduces the required reaction time over that range of temperatures and this accelerating effect of agitation upon the reaction, manifested in a reduction in time and/or temperature required to effect the reaction over a certain range of the permissible time and temperature reaction conditions, is illustrated and approximately defined by the broken line C and the solid line A in the graph of Fig. 4. It is accordingly to be understood that the reaction conditions may comprise any reaction period (time) and/or temperature within the area(s) defined by the solid lines A and B, or the solid line B and the broken line C of the graph of Fig. 4 and time-temperature reaction conditions defined within the said area of the graph defined by the solid line A and the broken line C, when accompanied by agitation, are therefore considered to be within the scope of this invention, as well as the time-temperature reaction conditions within the area defined by the solid lines A and B. The preferred time and temperature reaction conditions, either with or without agitation, are illustrated and defined by the dotted lines D, which set forth the principal area of most efficient and economical operating conditions. It will be noted that insufficient reaction periods and/or temperatures, i.e., reaction conditions within area to the left of the lines C or A in the graph of Fig. 4 depending upon whether or not agitation is employed, fail to produce the new calcium silicate hydrate of the instant invention, but typically result in calcium silicate hydrate I, a compound of variable composition referred to hereinbefore. Moreover, it has been found that over reacting, i.e., reaction periods and/or temperatures in the area to the right of or in excess of those defined by the solid lines A and B in the graph of Fig. 4, can result in calcium silicates of substantially different composition and physical and chemical properties or characteristics from the new calcium silicate compound, or products thereof, of the present invention. For example, certain time and/or temperature reaction conditions in excess of those indicated in the graph of Fig. 4, i.e., to the right of the necessary reaction area, have been found to produce, among other materials, compounds which simulate, or comprise the mineral truscottite and/or the mineral xonotlite, depending, of course, upon the $CaO/SiO_2$ molar ratio provided by the components, the temperature and/or time of exposure to the same.

Finally, the solids produced in accordance with the foregoing are filtered from the slurry and dried in any suitable manner.

The following example illustrates the preparation of our new hydrated calcium silicate, and it will be obvious that modifications can be made without departing from the spirit of the invention.

*Example I*

Pure silicic acid and calcium carbonate were separately ignited to 1000° C., and the resultant products were calcium oxide of 99.5% purity and silicon dioxide of 99.8% purity. These were mixed using 1.80 grams of silicon dioxide and 1.12 grams of calcium oxide and this mixture was placed in 14 cc. of distilled water and again mixed. The resulting slurry was placed in a watertight steel container which was sealed and the container was heated to a temperature of 232° C. (450° F.) and maintained at this temperature level for four hours. Upon completion of the heating step the container was cooled and the reacted slurry was removed, filtered and dried. Examination by X-ray analysis identified the newly formed dried material as a new and definite calcium silicate compound.

The new hydrated calcium silicate thus formed is a definite chemical compound having the formula $2CaO.3SiO_2$ with about 1 to 2.5 mols of water of hydration, and it averages about 2 mols of water, i.e., $2CaO.3SiO_2.2H_2O$. By conforming to the foregoing procedure, especially the necessary molar ratio of lime and silica and the disclosed time-temperature reaction conditions, since these are the major controlling factors, a substantially pure compound may be produced. The chemical formulation disclosed and claimed herein is not to be limited by any theory, but it is merely for the purpose of illustration and explanation.

The physical and chemical properties and characteristics of the new calcium silicate, referred to hereinafter as CS–55, are substantially different from the calcium silicate hydrate I of the Calvert patent, the minerals gyrolite and truscottite, or any other similar calcium silicate compound known to us. The following data, obtained by standard procedures, clearly illustrate and point out the distinguishing and characteristic physical and chemical properties of CS–55.

Upon X-ray analysis CS–55 manifests the following unique and characteristic pattern as compared to the X-ray diffraction patterns for calcium silicate hydrate I and the minerals gyrolite and truscottite. The gyrolite and truscottite patterns are reproduced for X-ray data found in Heller and Taylor, Crystallographic Data for the Calcium Silicates, Department of Scientific and Industrial Research, published by Her Majesty's Stationery Office, London, 1956.

| Angle 2° | d in A. | CSHI Intensity | CS–55 Intensity | Gyrolite Intensity | Truscottite Intensity |
|---|---|---|---|---|---|
| 3.7 | 23.86 | | M | | |
| 3.84 | 22.99 | | | VS | |
| 4.6 | 19.00 | | | | S |
| 7.9 | 11.18 | S | M | VS | |
| 8.2 | 10.77 | | M | | |
| 9.4 | 9.40 | | W | | S |
| 10.6 | 8.34 | | M | | |
| 11.2 | 7.83 | | W | M | |
| 11.6 | 7.65 | | | W | M |
| 14.0 | 6.30 | | | W | |
| 16.1 | 5.50 | S | | | |
| 17.4 | 5.09 | | | | |
| 17.6 | 5.02 | | | | VW |
| 18.7 | 4.75 | | | W | |
| 19.0 | 4.65 | | M | W | MW |
| 19.4 | 4.57 | | | | |
| 19.9 | 4.46 | | | | |
| 20.3 | 4.37 | | | | |
| 21.1 | 4.20 | | | S | |
| 21.2 | 4.12 | | VS | | |
| 21.5 | 4.13 | | | | S |
| 22.0 | 4.04 | | W | | |
| 22.5 | 3.95 | | | | |
| 23.4 | 3.80 | | | | MW |
| 24.0 | 3.71 | | | W | W |
| 24.4 | 3.65 | | W | MS | |
| 25.5 | 3.49 | W | W | | |
| 25.7 | 3.47 | | | W | MW |
| 26.7 | 3.34 | | | | W |
| 27.1 | 3.29 | W | | | |
| 28.0 | 3.18 | | | M | |
| 28.4 | 3.14 | | | | S |
| 28.6 | 3.12 | | VS | VS | |
| 29.0 | 3.08 | VS | | | |
| 29.4 | 3.04 | | VS | W | |
| 29.8 | 3.00 | | | | M |
| 29.9 | 2.99 | | | | |
| 30.0 | 2.98 | VS | | | |
| 30.9 | 2.89 | | | | |
| 31.6 | 2.83 | | | | S |
| 31.8 | 2.81 | | W | MS | |
| 32.1 | 2.79 | | W | | |
| 32.14 | 2.78 | | W | M | |
| 33.16 | 2.70 | | | M | |
| 34.0 | 2.64 | | S | | |
| 34.1 | 2.63 | | | | S |
| 35.7 | 2.51 | W | W | | W |
| 36.1 | 2.48 | | VW | | VW |
| 36.9 | 2.43 | | M | W | VW |
| 37.2 | 2.42 | | | W | VW |
| 37.3 | 2.41 | W | | | |
| 39.5 | 2.28 | M | M | W | |
| 39.9 | 2.26 | VVW | | W | W |
| 40.4 | 2.23 | | M | M | W |

Key: VS—very strong; S—strong; M—medium; W—weak; VW—very weak.

The differential thermal analysis patterns for CS–55 and calcium silicate hydrate I, obtained at a temperature increase of 12.5° C. per minute, are illustrated in Fig. 1 of the drawings. The patterns clearly illustrate the differences in the approach to, and the breaking points of the two compounds and their subsequent formation of two different compounds.

The dehydration curves for CS–55, calcium silicate hydrate I, gyrolite and truscottite are shown in Fig. 2 of the drawings. The gyrolite and truscottite curves each correspond to the dehydration curves of Fig. 2, page 454 of the A. L. Mackay and H. F. W. Taylor article, "Truscottite," The Mineralogical Magazine and Journal of the Mineralogical Society, vol. XXX, No. 226, September 1954. The thermal dehydration of CS–55 produces a rapid and substantially complete loss of water at low temperature, i.e., an initial weight loss of approximately 8% within the first 100° C. temperature increase, an overall loss of approximately 9% at 200° C. and a total weight loss of approximately 10% (10 to 11%) throughout the temperatures ranging from approximately 200° up to 1000° C., as is evidenced by its maintenance of an approximate constant weight throughout said temperature range. The foregoing dehydration characteristic is fully illustrated by the CS–55 curve of Fig. 2. Calcium silicate hydrate I exhibits a dehydration curve comprising a sudden and rapid loss of water at low temperatures, i.e., up to 200° C., a leveling off or plateau indicating little water loss and thus stability between the approximate temperatures of 200 to 400° C. initially not unlike that of CS-55. However, unlike CS-55, the calcium silicate hydrate I curve makes a second sharp rise, indicating a further rapid loss of water, between 400 and 600° C. before again leveling off, after a total water loss of approximately 16% by weight, and maintaining a substantially constant weight from 600 up to 1000° C. The dehydration of gyrolite results in a substantially rapid and uniform initial loss of water which gradually decreases as the temperature increases, with a minor plateau between 300 and 500° C., over the temperature range of 0 to 800° C. before finally leveling off at about 800° C. as indicated. The truscottite dehydration curve exhibits a very gradual and substantially uniform water loss throughout temperatures ranging up to approximately 800° C. when the curve levels off at a water loss represented by a reduction in weight of about 5.5% and continues without further substantial loss up to 1000° C. Thus, the relative stability of CS-55, as evidenced by its rapid initial loss of water at low temperatures, i.e., between approximately 100 to 200° C., and its subsequent maintenance of a substantially constant weight or water content over the balance of the temperature range, in comparison with the varying and irregular dehydration characteristics of calcium silicate hydrate I, gyrolite and truscottite, is significant.

Figure 3:
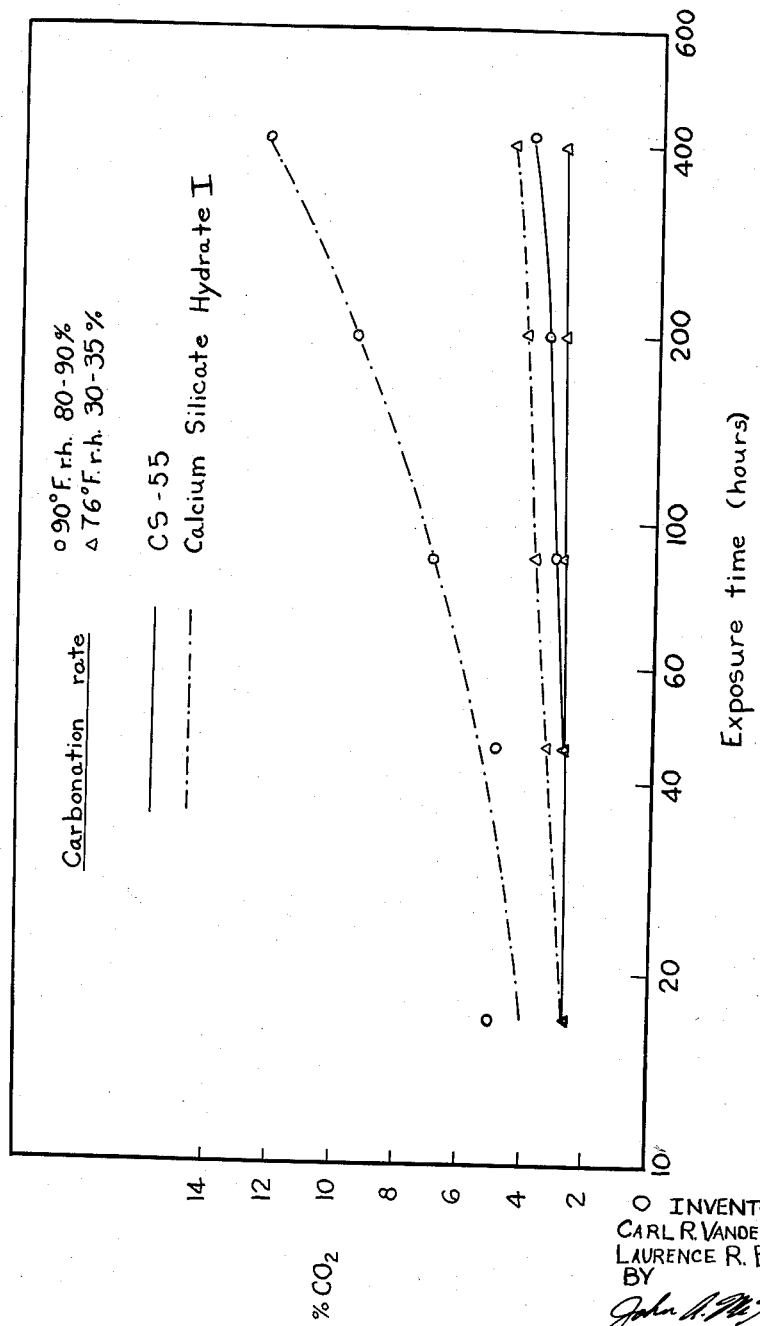
Fig. 3 is a graph showing a comparison of the carbonation rates of CS–55 and calcium silicate hydrate I.

The carbonation rate of CS-55 is compared with that of calcium silicate hydrate I in the graph illustrated in Fig. 3 of the drawings. The noticeable difference in the carbonation rate of the two types of products is clearly illustrated by the graph.

The solubility of the new compound or product, CS-55, is only 39 parts per million, as compared to a solubility of 101 parts per million for calcium silicate hydrate I. This particular characteristic is exceptionally noteworthy since it renders the product especially adaptable to fulfill certain requirements necessary for particular applications set forth hereinafter.

Further, the crystalline structure of the CS-55 compound or product is characteristically a crumbled plate single phase whereas the crystalline configuration of calcium silicate hydrate I consists of a fibrous or bladed structure, and the crystalline structures of the minerals gyrolite and truscottite consist of flat plates.

Frequently, and in many applications, it is not necessary to employ the new hydrous calcium silicate CS-55 in its purest form obtainable. Therefore, it is also within the scope of this invention to prepare and utilize a product comprising an adulterated form of the compound, or a mixture of the new compound with hydrated silica and/or possibly other calcium silicate products obtained when lime and a siliceous material are employed as starting ingredients in a CaO to $SiO_2$ molar ratio within the approximate range of 0.05 to 0.7 CaO to 1 $SiO_2$ and reacted together as specified above. In other words, since the advantageous and unique physical and chemical properties and characteristics of the product comprising an adulterated composition, or mixture of the new compound and hydrous silica, etc., within the foregoing CaO to $SiO_2$ molar ratio are substantially similar to those of the pure compound and are satisfactory for many applications, it is frequently desirable and advantageous, particularly for reasons of economy, to dilute or mix the pure compound with hydrous silica by including greater quantities of a siliceous material in the initial slurry than is necessary to obtain pure $2CaO.3SiO_2.1-2.5H_2O$.

Accordingly, it has been found that a satisfactory product may be prepared by employing a CaO to $SiO_2$ molar ratio within the approximate range of 0.05 to 0.7 CaO to 1 $SiO_2$, preferably, for commercial purposes, a molar ratio between 0.4 and 0.6 CaO to 1 $SiO_2$. However, in any case the reaction temperature and time must be within the approximate area(s) defined by the solid and/or broken lines in the graph of Fig. 4.

The following example illustrates the preparation of an adulterated form of the new compound and its unique properties. It is understood, of course, that the material and its method of preparation are exemplary and are not to be considered to limit the invention to the particular molar ratio of ingredients, solids content of the slurry and operating conditions outlined.

*Example II*

A slurry of silica was prepared by mixing finely ground diatomaceous earth with water so that the slurry contained 1.2 pounds of solids per gallon. A slurry of hydrated lime was prepared by mixing hydrated lime with water so that the slurry contained 2.0 pounds of solids per gallon. One hundred twenty-four gallons of diatomaceous earth slurry was pumped into the reactor where it was heated by direct injection steam. The diatomaceous earth slurry was followed by 90 gallons of water to flush the feed lines. Then 46 gallons of lime slurry was pumped into the reactor; this was followed by 15 gallons of flushing water to clear the lines. The reaction vessel was agitated continuously and was held at the desired reaction temperature of 232° C. (450° F.) by direct steam injection heating. The inert gases were vented from the top of the reactor so the pressure in the reactor was at equilibrium steam pressure increasing to 232° C., or about 410 p.s.i.g. The slurry was reacted for two hours at 232° C. and then was discharged through a cooler into an appropriate tank at such a rate that the reactor was emptied in about 35 minutes. The solids were filtered from the slurry and were dried and ground. The finished product had the following physical properties:

Bulk density, p.c.f. _____ 6.0.
Gardner-Coleman adsorption
 ($H_2O$) _____ 425 lbs./100 lbs. solids.

It should be appreciated that the feed slurry could be heated by means of heat exchangers and the reactor could be heated by alternate means such as a heating coil, electrical heating, etc. Also, the reactants can be added separately as described or together. The necessary elements of the process simply require bringing together the proper amounts of a reactive silica and hydrated lime in a water medium within a reactor, preferably with agitation, and reacting the same at a temperature and for a period of time as indicated by the appropriate solid and/or broken lines in the graph of Fig. 4.

Due to its unique and novel physical and chemical properties the new compound in either its pure or adulterated form, among other advantageous applications or uses, is especially suitable for use as a carrier in the preparation of a wettable powder insecticide dispersion. The following example illustrates the preparation of a 75% wettable DDT powder employing the new product CS-55 prepared as described in Example II.

*Example III*

A 75% wettable DDT powder was prepared by dry blending the following ingredients:

378.75 grams DDT, General Chemical Company, ground
27.5 grams Barden clay, a kaolinite clay
75.0 grams CS-55
11.25 grams Polyfon H, sodium lignosulfonate
7.5 grams Igepon T-77, sodium-N-methyl-N-oleoyltaurate The foregoing were ground in a 2 inch Reduction Engineering air jet mill, and the powder was subjected to tropical storage such as described in ICA No. 101055 (Oct. 10, 1955), DDT, 75%, water-dispersible powder, ICA Specification Number 101055. The powder from the tropical storage test was dispersed in standard 342 ppm hard water and was subjected to a suspendability test as described in ICA No. 101055 specification. A similar 75% DDT powder was made up and tested using calcium silicate hydrate I prepared in accordance with the teachings of Calvert. The results were as follows:

|  | Percent DDT in suspension after the tropical storage test |
|---|---|
| CS–55 | 1.6 |
| Calcium silicate hydrate I | 0.9 |

Inasmuch as the ICA specification requires the powder to have a suspendability of 1.2% or more after tropical storage, it is obvious that CS–55 is suitable and that calcium silicate hydrate I is not.

The new hydrous calcium silicate product is similarly suitable for use as a carrier for numerous other powdered insecticides, such as, for example, Shell Chemical Corporation's technical aldrin containing at least 77.9% 1,2,3,4,10,10-hexachloro - 1,4,4a,5,8,8a - hexahydro - 1,4-endo, exo-5,8-dimethanonaphthalene (HHDN) and dieldrin containing at least 85% 1,2,3,4,10,10-hexachloro-6,7-epoxy-1,4,4a,5,6,7,8,8a-octahydro-1, 4-endo, exo-5,8-dimethanonaphthalene (HEOD); aramite containing at least 90% 2-(p-tert-butylphenoxy) isopropyl-2-chloroethyl sulfite manufactured by the Naugatuck Chemical Division of the U.S. Rubber Company; or toxaphene, a chlorinated camphere ($C_{10}H_{10}Cl_8$) manufactured by Hercules Powder Co.

A still further significant difference between the product produced as described by this invention and that described by Calvert is the filtration rate of the reacted slurry. Calvert claims that the product produced according to his patent is a free filtering product which is a good filter aid. It has been confirmed that calcium silicate hydrate I prepared according to the Calvert patent has free filtering qualities. However, the new product which is described in this invention is not free filtering. Data substantiating this are as follows:

*Example IV*

One-half gallon of the reacted slurry containing about 0.5 pound solids per gallon was filtered on a Büchner filter. The slurry temperature was 71 to 77° C. and the vacuum was 27 inches of mercury. The product, CS–55, produced as described in Example II required 200 seconds to filter. A slurry containing calcium silicate hydrate I required only 35 seconds to filter.

One of the most important differences between the product described by Calvert and that described by this invention is the difference in solubility. It is believed that this to a great extent effects the suitability of the product for use in insecticide formulations and other applications. Inerts with low solubilities have less tendency to cause flocculation. The solubilities of calcium silicate hydrate I and CS–55 were determined by mixing an excess of the calcium silicate solids with distilled water and allowing the mixture to stand for 4 days. The solids were then filtered from the slurry, and the filtrate was analyzed. The filtrate which had been in contact with the calcium silicate hydrate I contained 101 p.p.m. of dissolved solids. The filtrate which had been in contact with the new calcium silicate described by this invention contained only 39 p.p.m. of dissolved solids.

It should be understood that the present disclosure is for the purpose of illustration only and that this invention includes all modifications and equivalents which fall within the scope of the appended claims.

What we claim is:

1. A low solubility hydrated calcium silicate consisting essentially of $2CaO.3SiO_2.1–2.5\ H_2O$, characterized by a unique X-ray diffraction pattern having very strong lines $d=3.12$ A. and $d=4.12$ A. and a medium line at $d=8.34$ A., and comprising the reaction product of an aqueous slurry of lime and a siliceous material in a $CaO/SiO_2$ molar ratio of 0.67 CaO to 1 $SiO_2$ at a temperature and for a period of time within the approximate boundaries defined by the solid lines A and B in the accompanying graph of Fig. 4.

2. A low solubility hydrated calcium silicate consisting essentially of $2CaO.3SiO_2.1–2.5H_2O$, characterized by a unique X-ray diffraction pattern having very strong lines $d=3.12$ A. and $d=4.12$ A. and a medium line at $d=8.34$ A., and comprising the reaction product of an aqueous slurry of lime and a siliceous material in a $CaO/SiO_2$ molar ratio of 0.67 CaO to 1 $SiO_2$ at a temperature and for a period of time within the approximate boundaries defined by the solid line B and the broken line C in the accompanying graph of Fig. 4, said slurry being subjected to agitation during the reaction.

3. A low solubility hydrated calcium silicate consisting essentially of $2CaO.3SiO_2.1–2.5H_2O$, characterized by a unique X-ray diffraction pattern having very strong lines $d=3.12$ A. and $d=4.12$ A. and a medium line at $d=8.34$ A., and comprising the reaction product of an aqueous slurry of lime and a siliceous material in a $CaO/SiO_2$ molar ratio of 0.67 CaO to 1 $SiO_2$ at a temperature and for a period of time within the preferred operating area defined by the dotted lines D in the accompanying graph of Fig. 4.

4. A low solubility hydrated calcium silicate consisting essentially of $2CaO.3SiO_2.1–2.5H_2O$, characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C., and comprising the reaction product of an aqueous slurry of lime and a siliceous material in a $CaO.SiO_2$ molar ratio of 0.67 CaO to 1 $SiO_2$ at a temperature and for a period of time within the approximate boundaries defined by the solid line B and broken line C. in the accompanying graph of Fig. 4.

5. A low solubility hydrated calcium silicate consisting essentially of $2CaO.3SiO_2.1–2.5H_2O$, characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C.

6. A low solubility hydrated calcium silicate product comprising a mixture of the low solubility hydrated calcium silicate compound $2CaO.3SiO_2.1–2H_2O$ and hydrous silica, said hydrated calcium silicate compound being characterized by a unique X-ray diffraction pattern having very strong lines $d=3.12$ A. and $d=4.12$ A. and a medium line at $d=8.34$ A., the mixture comprising the reaction products of an aqueous slurry of lime and a siliceous material in a $CaO/SiO_2$ molar ratio of from 0.4–0.6 CaO to 1 $SiO_2$ at a temperature and for a period of time within the approximate boundaries defined by the solid lines A and B in the accompanying graph of Fig. 4.

7. A low solubility hydrated calcium silicate product comprising a mixture of the low solubility hydrated calcium silicate compound $2CaO.3SiO_2.1–2.5H_2O$ and hydrous silica, said hydrated calcium silicate compound being characterized by a unique X-ray diffraction pattern having very strong lines $d=3.12$ A. and $d=4.12$ A. and a medium line at $d=8.34$ A., the mixture comprising the reaction products of an aqueous slurry of lime and a siliceous material in a $CaO/SiO_2$ molar ratio of from 0.4–0.6 CaO to 1 $SiO_2$ at a temperature and for a period of time within the approximate boundaries defined by the solid line B and the broken line C in the accompanying graph of Fig. 4, said slurry being subjected to agitation during the reaction.

8. A low solubility hydrated calcium silicate product comprising a mixture of the low solubility hydrated calcium silicate compound 2CaO.3SiO₂.1–2.5H₂O and hydrous silica, said hydrated calcium silicate compound being characterized by a unique X-ray diffraction pattern having very strong lines $d=3.12$ A. and $d=4.12$ A. and a medium line at $d=8.34$ A., the mixture comprising the reaction products of an aqueous slurry of lime and a siliceous material in a CaO/SiO₂ molar ratio of from 0.4–0.6 CaO to 1 SiO₂ at at temperature and for a period of time within the preferred operating area defined by the dotted lines D in the accompanying graph of Fig. 4.

9. A low solubility hydrated calcium silicate product comprising a mixture of the low solubility hydrated calcium silicate compound 2CaO.3SiO₂.1–2.5H₂O and hydrous silica, said hydrated calcium silicate compound being characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C., the mixture comprising the reaction products of an aqueous slurry of lime and a siliceous material in a CaO/SiO₂ molar ratio of from 0.4–0.6 CaO to 1 SiO₂ at a temperature and from a period of time within the approximate boundaries defined by the solid line B and the broken line C in the accompanying graph of Fig. 4.

10. A low solubility hydrated calcium silicate product comprising a mixture of the low solubility hydrated calcium silicate compound 2CaO.3SiO₂.1–2.5H₂O and hydrous silica, said hydrated calcium silicate compound being characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C.

11. A low solubility hydrated calcium silicate product comprising a mixture of the low solubility hydrated calcium silicate compound 2CaO.3SiO₂.1–2.5H₂O and hydrous silica, said hydrated calcium silicate compound being characterized by a unique X-ray diffraction pattern having very strong lines $d=3.12$ A. and $d=4.12$ A. and a medium line at $d=8.34$ A., the mixture comprising the reaction products of an aqueous slurry of lime and a siliceous material in a CaO/SiO₂ molar ratio within the range of 0.05–0.7 CaO to 1 SiO2 at a temperature and for a period of time within the approximate boundaries defined by the solid lines A and B in the accompanying graph of Fig. 4.

12. A low solubility hydrated calcium silicate product comprising a mixture of the low solubility hydrated calcium silicate compound 2CaO.3SiO₂.1–2.5H₂O and hydrous silica, said hydrated calcium silicate compound being characterized by a unique X-ray diffraction pattern having very strong lines $d=3.12$ A. and $d=4.12$ A. and a medium line at $d=8.34$ A., the mixture comprising the reaction products of an aqueous slurry of lime and a siliceous material in a CaO/SiO₂ molar ratio within the range of 0.05–0.7 CaO to 1 SiO₂ at a temperature and for a period of time within the boundaries defined by the solid line B and the broken line C in the accompanying graph of Fig. 4, said slurry being subjected to agitation during the reaction.

13. A low solubility hydrated calcium silicate product comprising a mixture of the low solubility hydrated calcium silicate compound 2CaO.3SiO₂.1–2.5H₂O and hydrous silica, said hydrated calcium silicate compound being characterized by a unique X-ray diffraction pattern having very strong lines $d=3.12$ A. and $d=4.12$ A. and a medium line at $d=8.34$ A., the mixture comprising the reaction products of an aqueous slurry of lime and a siliceous material in a CaO/SiO₂ molar ratio within the range of 0.05–0.7 CaO to 1 SiO₂ at a temperature and for a period of time within the preferred operating area defined by the dotted lines in the accompanying graph of Fig. 4.

14. A low solubility hydrated calcium silicate product comprising a mixture of the low solubility calcium silicate compound 2CaO.3SiO₂.1–2.5H₂O and hydrous silica, said hydrated calcium silicate compound being characterized by a unique X-ray diffraction pattern having very strong lines $d=3.12$ A., and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C., the mixture comprising the reaction products of an aqueous slurry of lime and a siliceous material in a CaO/SiO₂ molar ratio within the range of 0.05–0.7 CaO to 1 SiO₂ at a temperature and for a period of time within the approximate boundaries defined by the solid line B and the broken line C in the accompanying graph of Fig. 4.

15. A method of making a new hydrous calcium silicate compound having the formula 2CaO.3SiO₂.1–2.5H₂O which comprises the steps of forming an aqueous slurry of lime and a siliceous material in a CaO/SiO₂ molar ratio of 0.67 CaO to 1 SiO₂ and reacting the slurry at a temperature and for a period of time within the approximate boundaries defined by the solid lines A and B in the accompanying graph of Fig. 4.

16. A method of making a new hydrous calcium silicate compound having the formula $$2CaO.3SiO_2.1-2.5H_2O$$

which comprises the steps of forming an aqueous slurry of lime and a siliceous material in a CaO/SiO₂ molar ratio of 0.67 CaO to 1 SiO₂ and reacting the slurry at a temperature and for a period of time within the approximate boundaries defined by the solid line B and the broken line in the accompanying graph of Fig. 4, said slurry being subjected to agitation during the reaction.

17. A method of making a new hydrous calcium silicate compound having the formula $$2CaO.3SiO_2.1-2.5H_2O$$

which comprises the steps of forming an aqueous slurry of lime and a siliceous material in a CaO/SiO₂ molar ratio of 0.67 CaO to 1 SiO₂ and reacting the slurry at a temperature and for a period of time within the approximate boundaries defined by the solid line B and the broken line C in the accompanying graph of Fig. 4 to form the new hydrous calcium silicate characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C.

18. A method of making a new hydrous calcium silicate compound having the formula $$2CaO.3SiO_2.1-2.5H_2O$$

which comprises the steps of forming an aqueous slurry of lime and a siliceous material in a CaO/SiO₂ molar ratio of 0.67 CaO to 1 SiO₂ and reacting the slurry at a temperature and for a period of time within the preferred operating area defined by the dotted lines in the accompanying graph of Fig. 4 to form the new hydrous calcium silicate compound characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C.

19. A method of making a low solubility hydrated calcium silicate product comprising a mixture of the low solubility hydrated calcium silicate compound $$2CaO.3SiO_2.1-2.5H_2O$$

and hydrous silica which comprises the steps of forming an aqueous slurry of lime and a siliceous material in a CaO/SiO₂ molar ratio of 0.4–0.6 CaO to 1 SiO₂ and reacting the slurry at a temperature and for a period of time within the approximate boundaries defined by the solid lines A and B in the accompanying graph of Fig. 4.

20. A method of making a low solubility hydrated calcium silicate product comprising a mixture of the low solubility hydrated calcium silicate compound $$2CaO.3SiO_2.1-2.5H_2O$$

and hydrous silica which comprises the steps of forming an aqueous slurry of lime and a siliceous material in a CaO/SiO₂ molar ratio of 0.4–0.6 CaO to 1 SiO₂ and reacting the slurry at a temperature and for a period of time within the approximate boundaries defined by the solid line B and the broken line C in the accompanying graph of Fig. 4, said slurry being subjected to agitation during the reaction.

21. A method of making a low solubility hydrated calcium silicate product comprising a mixture of the low solubility hydrated calcium silicate compound $$2CaO.3SiO_2.1-2.5H_2O$$

and hydrous silica which comprises the steps of forming an aqueous slurry of lime and a siliceous material in a CaO/SiO₂ molar ratio of 0.4–0.6 CaO to 1 SiO₂ and reacting the slurry at a temperature and for a period of time within the approximate boundaries defined by the solid line B and the broken line C in the accompanying graph of Fig. 4 to form a hydrous calcium silicate characterized by a unique X-ray diffraction pattern having very strong lines $d=3.12$ A. and $d=4.12$ A. and a medium line at $d=8.34$ A. and a thermal dehydration curve exhibiting a weight loss of approximately 10% of the total for the temperature increase of from 0° C. up to about 200° C. and thereafter approximately maintaining a constant weight up through temperatures of 1000° C.

22. A method of making a low solubility hydrated calcium silicate product comprising a mixture of the low solubility hydrated calcium silicate compound $$2CaO.3SiO_2.1-2.5H_2O$$

and hydrous silica which comprises the steps of forming an aqueous slurry of lime and a siliceous material in a CaO/SiO₂ molar ratio of 0.4–0.6 CaO to 1 SiO and reacting the slurry at a temperature and for a period of time within the preferred operating area defined by the dotted lines D in the accompanying graph of Fig. 4 to form a hydrous calcium silicate characterized by a unique X-ray diffraction pattern having very strong lines $d=3.12$ A. and $d=4.12$ A. and a medium line at $d=8.34$ A. and a thermal dehydration curve exhibiting a weight loss of approximately 10% of the total for the temperature increase of from 0° C. up to about 200° C. and thereafter approximately maintaining a constant weight up through 1000° C.

23. A method of making a new hydrous calcium silicate product comprising a mixture of the low solubility hydrated calcium silicate compound $2CaO.3SiO_2.1-2.5H_2O$ and hydrous silica, which comprises the steps of forming an aqueous slurry of lime and a siliceous material in a CaO/SiO₂ molar ratio within the range of 0.05–0.7 CaO to 1 SiO₂ and reacting the slurry at a temperature and for a period of time within the approximate boundaries defined by the solid lines A and B in the accompanying graph of Fig. 4.

24. A method of making a new hydrous calcium silicate product comprising a mixture of the low solubility hydrated calcium silicate compound $$2CaO.3SiO_2.1-2.5H_2O$$

and hydrous silica, which comprises the steps of forming an aqueous slurry of lime and siliceous material in a CaO/SiO₂ molar ratio within the range of 0.05–0.7 CaO to 1 SiO₂ and reacting the slurry at a temperature and for a period of time within the approximate boundaries defined by the solid line B and the broken line C in the accompanying graph of Fig. 4, said slurry being subjected to agitation during the reaction.

25. A method of making a new hydrous calcium silicate product comprising a mixture of the low solubility hydrated calcium silicate compound $$2CaO.3SiO_2.1-2.5H_2O$$

and hydrous silica, which comprises the steps of forming an aqueous slurry of lime and siliceous material in a CaO/SiO₂ molar ratio within the range of 0.05–0.7 CaO to 1 SiO₂ and reacting the slurry at a temperature and for a period of time within the approximate boundaries defined by the solid line B and the broken line C in the accompanying graph of Fig. 4 to form a hydrous calcium silicate characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C.

26. A method of making a new hydrous calcium silicate product comprising a mixture of the low solubility hydrated calcium silicate compound $$2CaO.3SiO_2.1-2.5H_2O$$

and hydrous silica, which comprises the steps of forming an aqueous slurry of lime and siliceous material in a CaO/SiO₂ molar ratio within the range of 0.05–0.7 CaO to 1 SiO₂ and reacting the slurry at a temperature and for a period of time within the preferred operating area defined by the dotted lines D in the accompanying graph of Fig. 4 to form a hydrous calcium silicate characterized by a unique X-ray diffraction pattern having very strong lines $d=3.12$ A. and $d=4.12$ A. and a medium line at $d=8.34$ A., and a thermal dehydration curve exhibiting a weight loss of approximately 10% of the total for the temperature increase of from 0° C. up to about 200° C. and thereafter approximately maintaining a constant weight up through temperatures of 1000° C.

References Cited in the file of this patent

UNITED STATES PATENTS

| | | |
|---|---|---|
| 2,665,996 | Kalousek | Jan. 12, 1954 |
| 2,748,008 | Kalousek | May 29, 1956 |

OTHER REFERENCES

Flint et al.: J. Res. of the Natl. Bur. of Stds., vol. 21, RP-1147, pp. 617–638, November 1938.